(12) United States Patent
Shue et al.

(10) Patent No.: US 6,862,564 B1
(45) Date of Patent: Mar. 1, 2005

(54) NETWORK EMULATOR

(75) Inventors: Chikong Shue, Andover, MA (US);
John Thomas Moy, Acton, MA (US);
Tao Yang, Acton, MA (US); Raymond Xie, Westford, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 385 days.

(21) Appl. No.: 09/696,860

(22) Filed: Oct. 26, 2000

(51) Int. Cl.$^7$ ............................................. G06F 13/00
(52) U.S. Cl. ......................... 703/25; 703/27; 709/243; 370/395
(58) Field of Search ..................... 703/25, 27; 709/224, 709/225, 236, 243, 229, 226, 238, 239, 313; 370/231, 232, 395, 352

(56) References Cited

U.S. PATENT DOCUMENTS

| | | | | |
|---|---|---|---|---|
| 6,101,543 A | * | 8/2000 | Alden et al. | 709/229 |
| 6,134,514 A | * | 10/2000 | Liu et al. | 703/17 |
| 6,195,345 B1 | * | 2/2001 | Kramer | 370/352 |
| 6,412,009 B1 | * | 6/2002 | Erickson et al. | 709/228 |
| 6,493,316 B1 | * | 12/2002 | Chapman et al. | 370/231 |
| 6,519,642 B1 | * | 2/2003 | Olsen et al. | 709/227 |
| 2002/0141418 A1 | * | 10/2002 | Ben-Dor et al. | |

* cited by examiner

Primary Examiner—Thai Phan
(74) Attorney, Agent, or Firm—Weingarten, Schurgin, Gagnebin & Lebovici LLP

(57) ABSTRACT

A system and a method for providing an emulated network including a plurality of emulated networking devices, in which a number of network node executable images are employed. Each of the network node executable images corresponds to one of the emulated networking devices. The emulated networking devices represent physical networking devices, such as optical switches. A portion of each of the network node executable images is operable to execute without modification on a physical networking device. Each of the network node executable images includes a number of program components, such as a topology related program component for maintaining a representation of the topology of the emulated network, a trunk manager program component for maintaining at least one emulated trunk between the corresponding emulated networking device and an adjacent other emulated networking device, and a circuit manager program component operable to maintain at least one emulated circuit between the corresponding emulated networking device and another one of the emulated networking devices. Various numbers of network node executable images may be executed on a single emulator machine, and multiple emulator machines may be employed to execute a single network node executable image.

21 Claims, 4 Drawing Sheets

NETWORK EMULATOR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to simulating a computer network, and more specifically to a system and method for large scale testing and validation of optical switching equipment and software.

As the need for data and voice communications bandwidth has steadily increased, communication networks have grown to include ever larger numbers of sophisticated networking devices, such as optical switches. These networking devices often include complex data forwarding functionality, which is typically provided using a combination of software and hardware components. For example, networking devices often include multiple, interconnected, printed circuit boards, sometimes referred to as "blades" or "cards", one or more of which may include microprocessor-based subsystems for execution of various software components. The operation of such networking devices is significantly dependent on the specific network configuration in which they are deployed. Accordingly, testing of such devices should include tests of their operation in a variety of network configurations.

For example, during development of software for execution within a networking device, software verification testing should test the software in a variety of network configurations. Because the number of networking devices required to perform a comprehensive set of such tests may be relatively large, and because the amount of time necessary to reconfigure actual networking devices into the various specific configurations to be tested may be so great as to be impractical, testing based on emulation of various network configurations may sometimes be desirable. In fact, a software emulation system capable of emulating large and complex networks would significantly reduce overall software development time and equipment expense.

Additionally, it may be desirable to test proposed or hypothetical network configurations when designing a new network, or when planning modifications to an existing network. In this regard, customers of networking device providers often wish to determine how a specific configuration of devices will operate before purchasing the actual equipment. Network emulation may thus advantageously be used during network planning and design, and to perform "what if" testing of possible network modifications.

Various existing systems have attempted to provide effective software emulation of communication networks. Some such existing systems have emulated operation of networking device software using software that has been "ported" from an execution environment present on the networking devices, to another execution environment used within the emulator system. For example, the execution environment within a networking device may include a microprocessor, operating system, and/or other aspects which differ from those used in the emulation system. In order for the networking device software to execute within the emulation environment, it has, in such existing systems, been modified or "ported" from the form in which it is used within the networking device. However, such code modifications raise issues of whether the modified code behaves the same as the actual code that is or will be deployed in the networking device. Accordingly, the accuracy of testing provided by such existing systems may be poor.

For the reasons stated above, it would be desirable to have a network emulation system that supports testing of large numbers of complex networking devices using code that is not modified from the form in which it would be used within the actual networking devices.

BRIEF SUMMARY OF THE INVENTION

In accordance with the present invention, a system and method for providing an emulated network including multiple emulated networking devices are disclosed. In the disclosed system, a number of network node executable images are employed. Each of the network node executable images corresponds to an emulated networking device. The emulated networking devices represent physical networking devices, such as optical switches. Each of the network node executable images includes executable code that is operable to execute without modification on a physical networking device. In a preferred embodiment, the executable code that is operable to execute without modification on a physical networking device includes executable code for signaling, routing, trunk management, circuit management and port management. Further in the preferred embodiment, the executable code that is operable to execute without modification on a corresponding physical network device is executable code that is operable to be executed within one of several cards that make up the corresponding physical network device. Additionally, the executable code that is operable without modification on a corresponding physical network device may further be linked to other executable code within each network node executable image which may, for example, not be operable without modification on the corresponding physical network device. Such modified code, for example, may perform other functions within the corresponding physical network device, and be executed on other cards within the physical network device. Such modified code may further be generated from a common source code program as is used to generate actual code operable for execution on such other cards within the corresponding physical network device.

More specifically, in a further aspect of the disclosed system, the executable code of the network node executable image that is operable without modification on a corresponding physical network device may include a topology related program component for maintaining a representation of the topology of the emulated network, a trunk manager program component for maintaining at least one emulated trunk between the corresponding emulated networking device and an adjacent other emulated networking device, and a circuit manager program component operable to maintain at least one emulated circuit between the corresponding emulated networking device and another one of the emulated networking devices.

Various numbers of network node executable images may be executed on a single emulator machine. For example, in a first illustrative embodiment, multiple network node executable images may execute on a single emulator machine. Such a configuration is efficient in terms of emulator machine resources. Alternatively, each of the network node executable images may execute on separate, respective emulator machines. This type of configuration may provide highly accurate performance testing. Moreover, multiple emulator machines may be used to execute a single one of the network node executable images. Such a configuration would be useful, for example, when testing communication functions between components of a network node executable image that are assigned to different cards within the emulated networking device. In the case where multiple emulator machines are employed, they may be interconnected by a local area network such as an Ethernet LAN. Moreover, each of the plurality of network node executable images further includes a code component used to provide communication during emulator operation, and an alternative code component used during operation within an actual physical networking device. In an illustrative embodiment, these alternative code components are provided in two network layer drivers. The appropriate network layer driver is loaded for execution based on a configuration file which indicates whether the specific network node executable image is being used within the network emulator, or within an actual physical networking device.

In this way there is disclosed a system and method for emulating a number of networking devices within a communications network. The disclosed system provides validation of operation within various network topologies, since the executable code representing each of the emulated networking devices is the same executable image that is used in the actual physical devices being emulated. The disclosed system may be used to accurately test the operation of new software images prior to installation of the images within the physical networking devices on which they are to be used, and for testing of potential network designs and modifications.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
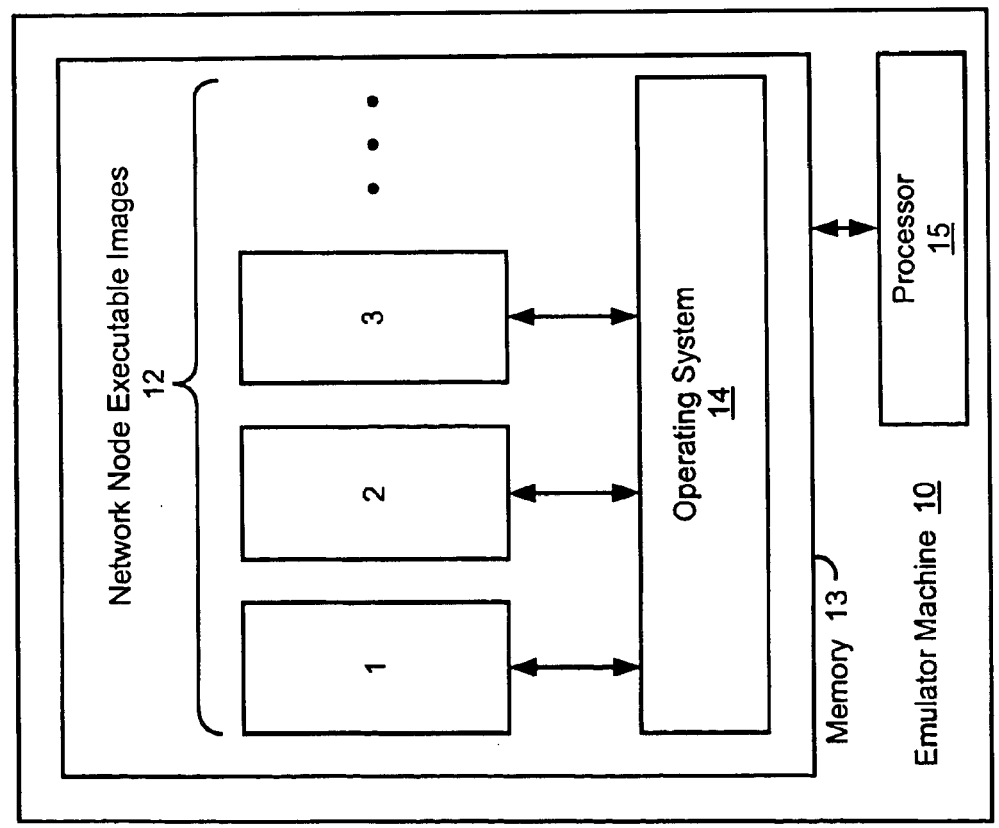
FIG. 1 shows a number of network node executable images executing within a single emulator machine.

As illustrated in FIG. 1, an emulator machine 10 may be used to execute a number of network node executable images 12, in conjunction with an operating system 14. The emulator machines shown in FIGS. 1–3 may be embodied using any appropriate code execution platform, such as a personal computer, workstation, or other hardware system. An emulator machine may include one or more processors 15 and associated memory 13 for storing code to be executed using such processors. The operating system 14 may be embodied using, for example, a conventional operating system such as those provided by Microsoft Corporation (Windows™, Windows NT™), UNIX or a UNIX-like operating system, such as Linux, or any other appropriate operating system for a particular implementation.

The network node executable images 12 represent code that is directly executable on the underlying hardware of the emulator machine 10. In an alternative embodiment, the network node executable images may be indirectly executable on the emulator machine 10 through use of a virtual machine (not shown).

As shown in FIG. 1, the disclosed system may be embodied or configured such that several network node executable images 12 are executed within a single emulator machine 10. Such a configuration may be efficient in terms of emulating network configurations involving multiple nodes using a single emulator machine 10. Other configurations are described in connection with the following FIGS. 2–3.

Figure 2:
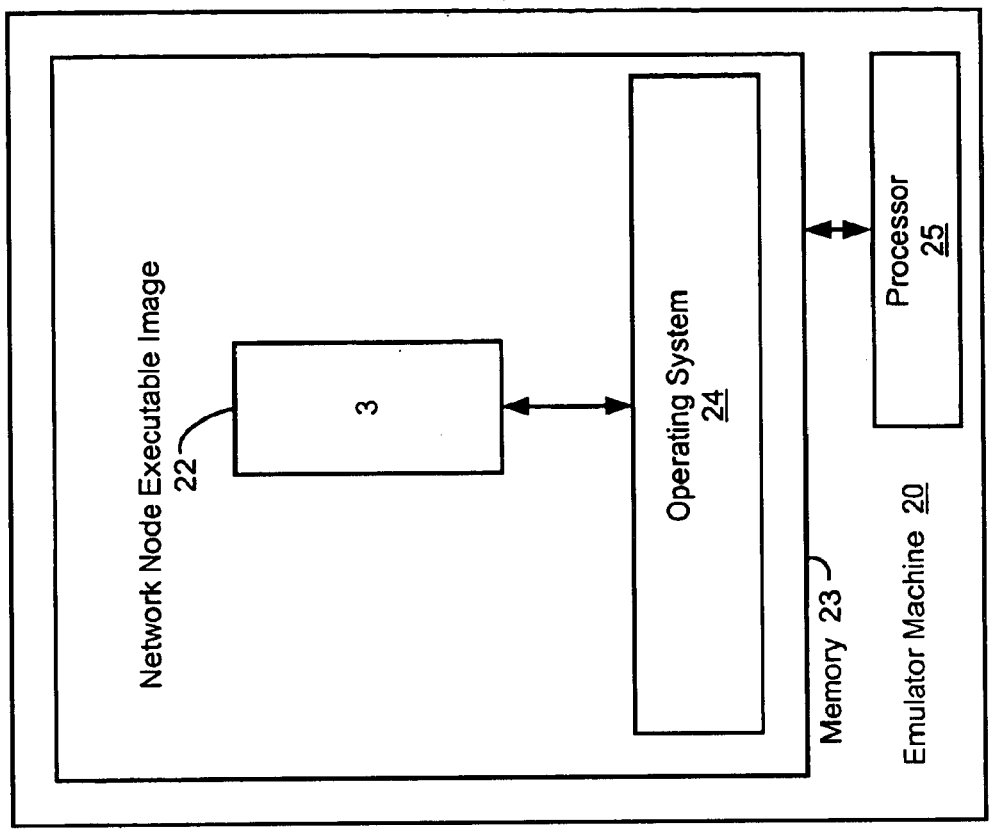
FIG. 2 shows a single network node executable image executing within a single emulator machine.

FIG. 2 illustrates a configuration of the disclosed system in which a single emulator machine 20 is used to execute a single network node executable image 22, in conjunction with an operating system 24. The emulator machine 20 of FIG. 2 is further shown including a processor 25 and associated memory 23. The configuration of FIG. 2 may be useful for testing the operation of a single network node executable image, for example, in the case where new code has been developed and should be tested for correctness. Further, in an illustrative embodiment, a number of emulator machines, such as the emulator machine 20, each having a single network node executable image executing thereon, may be interconnected through a network such as a local area network. Such an interconnection of multiple emulator machines having single network node executable images executing thereon may be used to accurately emulate the behavior and/or performance of the same number of physical networking devices within an actual network.

Figure 3:
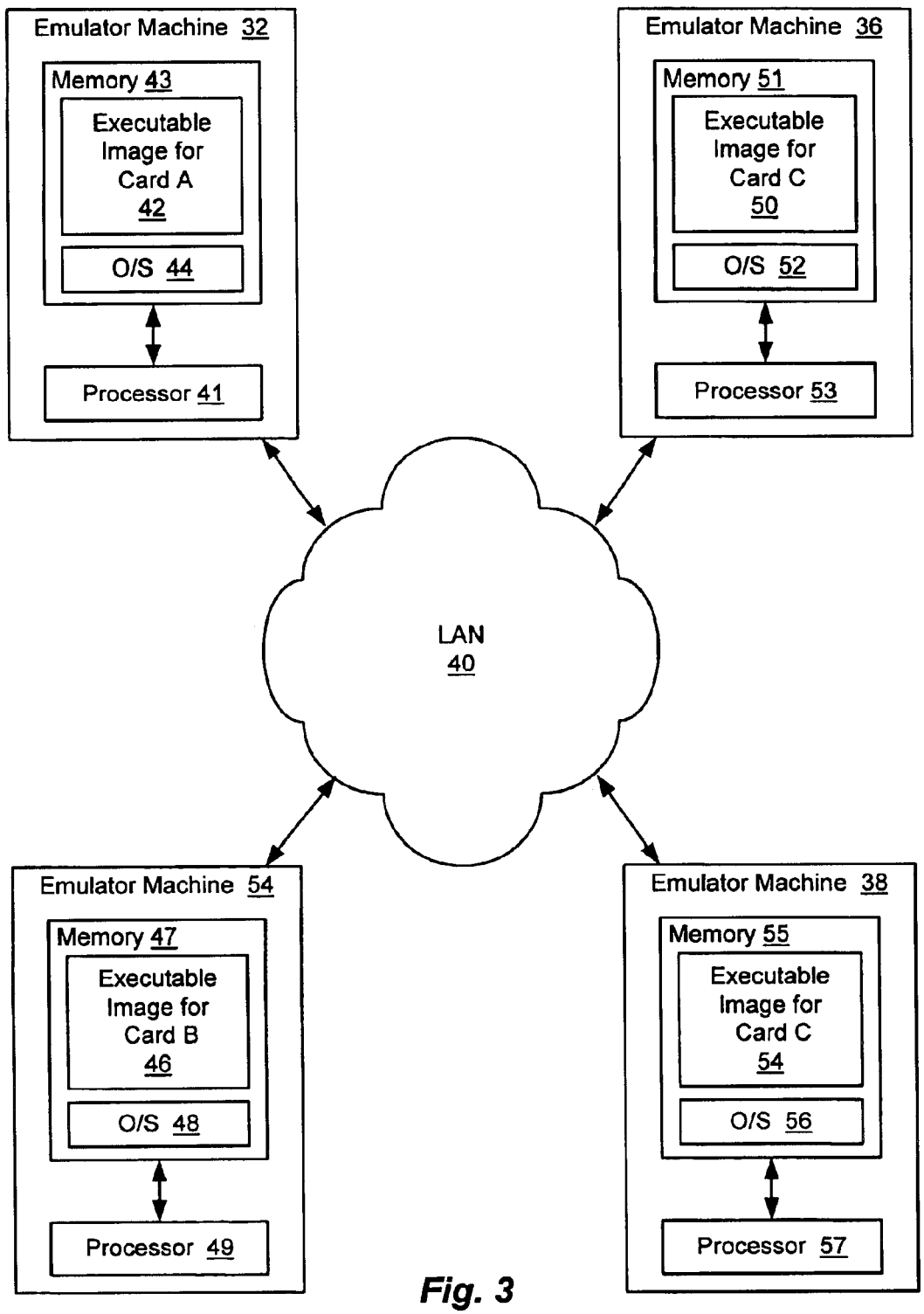
FIG. 3 shows executable images associated with individual component cards of a networking device executing within respective emulator machines.

Referring now to FIG. 3, a local area network 40 is shown interconnecting the emulator machines 32, 34, 36 and 38. As shown in FIG. 3, the disclosed system may be used to emulate the behavior of individual cards that provide a portion of the functionality within actual physical networking devices. As shown in FIG. 3, the emulator machine 32 includes a network node executable image 42 for a card A stored with an operating system 44 in a memory 43, for execution on a processor 45. The emulator machine 34 includes a network node executable image 46 for a card B stored with an operating system 48 in a memory 46, for execution on a processor 49. The emulator machine 36 includes a network node executable image 50 for a card C stored with an operating system 52 in a memory 51, for execution on a processor 53. Emulator machine 38 includes a network node executable image 54 stored with an operating system 56 in a memory 55, for execution on a processor 57. The network node executable images shown in FIG. 3 may correspond to cards from within a single or multiple actual physical networking devices. For example, card A, card B, card C and card D may be identical cards of different networking devices within the emulated network. In an illustrative embodiment, card A, card B, card C and card D are each Switch Management Cards (SMCs) for respective ones of individual networking devices within an emulated network. Such SMCs may, for example, provide functionality related to signaling, routing, trunk management, circuit management, and port management. Alternatively, card A, card B, card C and card D may be separate, dissimilar cards within a single emulated device.

Figure 4:
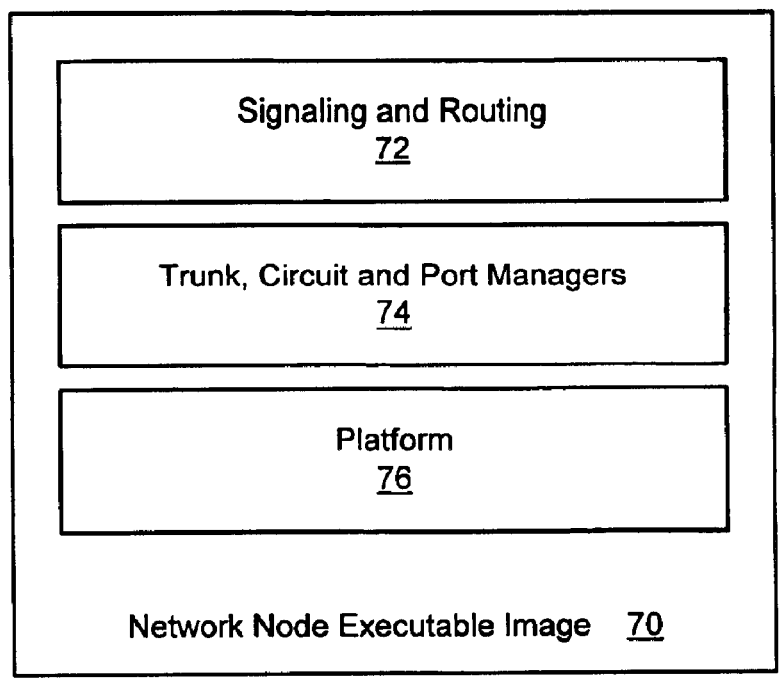
FIG. 4 shows the functional components within a network node executable image.

FIG. 4 shows an illustrative embodiment of a network node executable image 70, including signaling and routing functionality 72, as well as trunk, circuit and port manager functionality 74, and platform functionality 76. As it is generally known, signaling within the context of telephony related systems generally involves the exchange of information between nodes within a network in order to set up, control, and terminate a number of calls. Two forms of signaling may be provided by one or more signaling code entities within the signaling and routing functionality 72 of the network node executable image 70. First, "in-band" signaling may be provided, in which signaling information is exchanged within the same channel as the subject call or calls. Second, "out-of-band" signaling may be performed on separate, dedicated signaling channels. The signaling provided through the signaling and routing functionality 72 of the network node executable image 70 may include either in-band signaling, out-of-band signaling, or both.

Further for purposes of illustration, a routing code entity provided within the signaling and routing functionality 72 may, for example, implement the OSPF (Open Shortest Path First) router protocol. As it is generally known, OSPF is a router protocol which may be used as an alternative to the Routing Information Protocol (RIP). Like RIP, OSPF is designated by the Internet Engineering Task Force (IETF) as one of several Interior Gateway Protocols (IGPs). In an alternative embodiment, the routing program code provided within the signaling and routing functionality 72 may be based on RIP.

An illustrative embodiment of a trunk manager program code entity within the trunk, circuit and port manager functionality 74 is now described. As used herein, the term "trunk" shall refer to a logical link between two networking devices over which one or more circuits can be provisioned. The trunk manager code entity generally provides the following functions:

(a) Management and maintenance of state information for all trunks within the networking device, including creation and/or deletion of trunks in response to commands or instructions received, for example, from one or more network management code entities. The trunk manager is further responsible for maintaining the integrity of a trunk database after initialization or recovery from a failure.

(b) Bandwidth reservation and port mapping services.

(c) Translation of port/APS events (port down, port up, switchover, etc.), received from a port manager code entity, into trunk events. As used herein, a "port" refers to an interface of the networking device to an external communication media. For example, an OC-48 port may consist of an interface to what is generally referred to as a Synchronous Optical Network (SONET) OC-48 communications channel located on a port interface card (PIC) within the networking device. Further, as used herein, the term "APS group" refers to a set of ports that participate in a particular SONET APS (Automatic Protection Switching) configuration, consisting of one protection port and one or more working ports.

(d) Reporting of relevant trunk events to a routing code entity.

(e) Performing connectivity checks for each trunk.

Further in an illustrative embodiment, the trunk manager program code within the trunk, circuit and port manager functionality 74 runs as a Linux process both on an SMC card, when it executes on an actual networking device, and when it executes as part of a network node executable image executing on an emulator machine. The trunk manager program code may further interface with routing, resource manager, port manager, link manager, and network management software entities through any appropriate messaging protocol performed using Linux sockets. For example, an interface to a network management software entity may be used to receive trunk configuration commands. Similarly, a trunk manager interface to a routing entity may be used to inform the routing entity of any trunk events that are of interest to the routing entity (e.g., add/delete a trunk). An interface to a routing entity may further be used to reserve bandwidth on a particular trunk when setting up a virtual circuit, and to release bandwidth when a virtual circuit is torn down. A trunk manager interface to a port manager entity may be used to receive port and APS information from the port manager. A trunk manager interface with a link manager entity may be used to learn about the configuration of a remote port so that the trunk manager may perform connectivity checks.

Also in the trunk, circuit and port manager functionality 74, may be included port manager program code embodied as one or more "port manager" program code entities. During operation, each port manager entity may generate a number of port/APS events to the trunk manager. The trunk manager then updates its own database based on such events, translates the port events into trunk events, and reports them to the routing and/or signaling entities. In an illustrative embodiment, there are five types of messages exchanged between the trunk manager entity and the port manager entity: Add, Delete, Update, Hello, and Synch. These messages are now described in further detail.

After a physical port/APS is first configured successfully, a port manager entity sends an Add message to the trunk manager entity. Included in the message are the following parameters:

(a) Port ID. If APS is configured, this is the protection port ID of the APS group. Otherwise, this is the port to be added.

(b) APS configuration information.

(c) Bandwidth. Size of quantum and count.

(d) Administrative information regarding the type of port added.

As a result of the Add command, if APS is configured, one APS object and multiple port objects will be created within the trunk manager entity. Otherwise, only one port object will be created.

After a port/APS is deleted successfully, the port manager entity sends a Delete message to the trunk manager. Included within the Delete message is the following parameter: Port ID. The protection port ID of the APS group, or the port ID of the port, to be deleted from the trunk manager entity's database.

In a first embodiment, if the deleted port is part of an APS group, the entire APS group is deleted. Partial deletion may be provided in an alternative embodiment.

The port manager entity sends an Update message to the trunk manager entity when there is a change in port/APS status. Update messages are further classified into six subtypes: Arch Change, Working-to-Protect Switchover, Protect-to-Working Switchover, Protect Down, Protect Up, and APS Down, which are now further described.

The port manager entity sends an Arch Change message to the trunk manager entity when the APS architecture is changed. Included in the Arch Change message is a parameter indicating the Physical port ID of the protection port in the APS group.

The port manager entity sends the Working-to-Protect Switchover message to the trunk manager entity when it has successfully performed a switchover from a working port to the protection port. Included in the message are the following parameters:

(a) Physical port ID of the protection port in the APS group.
(b) Physical port ID of the working port in the APS group.

The port manager entity sends the Protect-to-Working Switchover message to the trunk manager entity when it has successfully performed a switchover from the protection port to a working port. Included in the message are the following parameters:
(a) Port ID of the protection port in the APS group.
(b) Port ID of the working port in the APS group.

The port manager entity sends the Protection Up message to the trunk manager entity when a protection port changes status from down to up. Included in the message is the following parameter: Port ID of the protection port in the APS group.

The port manager entity sends the Protection Down message to the trunk manager when the protection port changes status from up to down. Included in the message is the following parameter: Port ID of the protection port in the APS group.

The port manager entity sends the APS Down message to the trunk manager entity when it determines that an entire APS group is down. This message includes the following parameter: Port ID of the protection port in the APS group.

Both the trunk manager and port manager entities use Hello message to inform the other that synchronization is needed. Included within the Hello message are the following parameters:
(a) Sequence Number.
(b) Hello Type. May indicate either "initiating synch" or "acknowledging synch."

The port manager sends Synch messages to the trunk manager in order to download its port database. A Synch message consists of multiple Add messages, each for an APS group. Included in the Synch message are the following parameters:
(a) Sequence Number.
(b) List of Add Messages. Empty list signals the end of synchronization.

In addition to the trunk manager and port manager entities, a circuit manager entity may further be included within the trunk, circuit and port functionality 74 shown in FIG. 4. The circuit manager entity may, for example, maintain the state of various virtual circuits used for communication over associated trunks between actual networking devices. Accordingly, the circuit manager code entity operates to set-up and tear-down various virtual circuits. One or more virtual circuits may, for example, be carried over a single trunk.

The platform code 76 shown in the network node executable image 70 of FIG. 4 is responsible for registering any processes used to provide the various code entities within the network node executable image 70. The platform code may further operate to read any necessary configuration information, such as may be stored within one or more configuration files, that is used to configure the various code entities of the network node executable image. Further, the platform code 76 is operable to maintain one or more Management Information Base (MIB) that may be used by the network management functionality of the device. In addition, the platform functionality may operate to control a network management command line interface to the network device. In these ways, the platform 76 operates to maintain various resources, such as databases, that are employed by various other entities within the networking device for various reasons.

In an illustrative embodiment in which the trunk manager program code, circuit manager program code, port manager program code, and signaling and routing program code are each implemented as one or more Linux processes, the operating systems shown in the emulator machines of FIGS. 1–2 would each be the Linux operating system. Similarly, in such an embodiment, the operating system of the SMC on which the trunk manager program code executes within the actual networking device would also be Linux. Such commonality of operating systems between the actual networking devices and the emulator machines advantageously enables the same executable code to used on the emulator machines as on the actual networking devices.

Further in an illustrative embodiment, one or more of the program code entities within the network node executable image may be implemented as what are conventionally referred to as "daemons", which is a term generally used to refer to programs that run continuously and exist for the purpose of handling periodic service requests. Each such daemon program forwards the service requests it receives to other programs (or processes) as appropriate.

Moreover, while the description of the trunk and port manager entities above has been with reference to actual trunks and ports, the trunk and port manager entities maintain and operate in conjunction with emulated trunks and ports when operating within one or more emulator machines. The virtual circuit manager entity within the network node executable image is also operable to support both emulated and actual virtual circuits, depending on whether it is executing within an emulator machine or a physical networking device, respectively. Similarly, the routing and signaling entities are capable of maintaining and operating in conjunction with a topology of an emulated network, just as they would maintain and operate in conjunction with a topology of an actual network topology when executing in a physical networking device.

Figure 5:
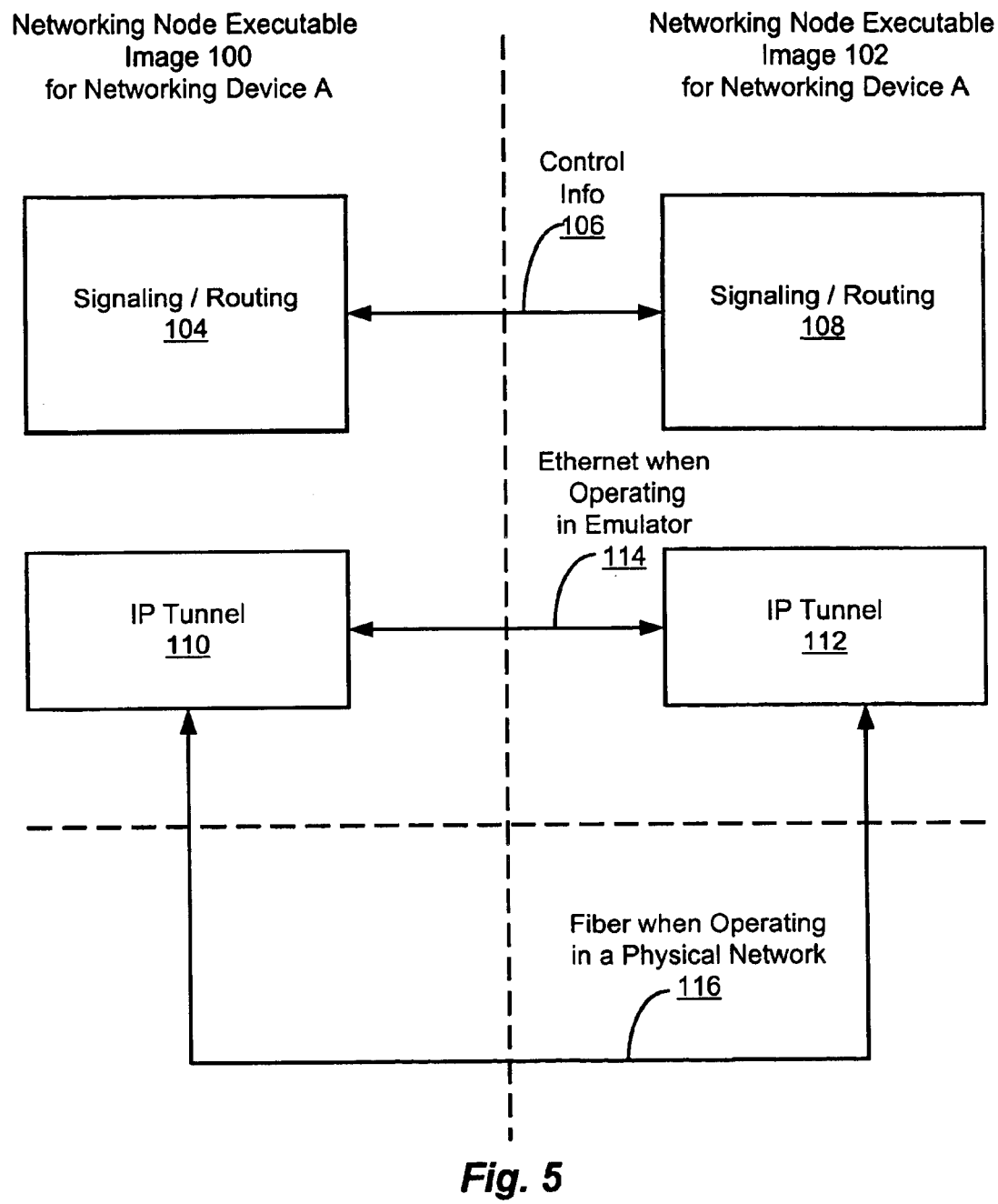
FIG. 5 illustrates operation of network node executable images within the emulator system and within a physical network.

FIG. 5 illustrates how two network node executable images operate, both when loaded within respective physical networking devices, and when loaded onto one or more emulator machines. As shown in FIG. 5, the network node executable image 100 associated with a Networking Device A includes a signaling and routing functionality 104, which exchanges control information 106 with the signaling and routing functionality 108 within the network node executable image 102 of a Networking Device B 102. The communications between a physical Networking Device A and a physical Networking Device B are provided over a fiber optic cable 116. The network node executable images 100 and 102 for Networking Device A and Networking Device B each include Internet Protocol (IP) tunnel supporting program code, shown as IP Tunnel code 110 and IP Tunnel code 112. An IP Tunnel is thus provided for communication between the network node executable image 100 and the network node executable image 102. In the case where the two network node executable images of FIG. 5 are operating on one or more emulator machines, then the IP Tunnel is provided over an Ethernet local area network 114. Alternatively, when the two network node executable images of FIG. 5 are operating within respective physical networking devices, the IP Tunnel is provided over the fiber optic cable 116.

In an illustrative embodiment, each of the network node us) executable images 100 and 102 of FIG. 5 include a code component used to provide communication during emulator operation, and an alternative code component used during operation within an actual physical networking device. In this illustrative embodiment, these alternative code components are provided by alternative network layer drivers, also referred to as protocol driver images, each of which may provide the IP Tunnel functionality shown by IP Tunnel code 110 and IP Tunnel code 112 in FIG. 5. The appropriate network layer driver is loaded for execution into each network node executable image based on configuration information indicating whether the specific network node executable image to be used within an emulator machine, or within an actual physical networking device.

Figure 6:
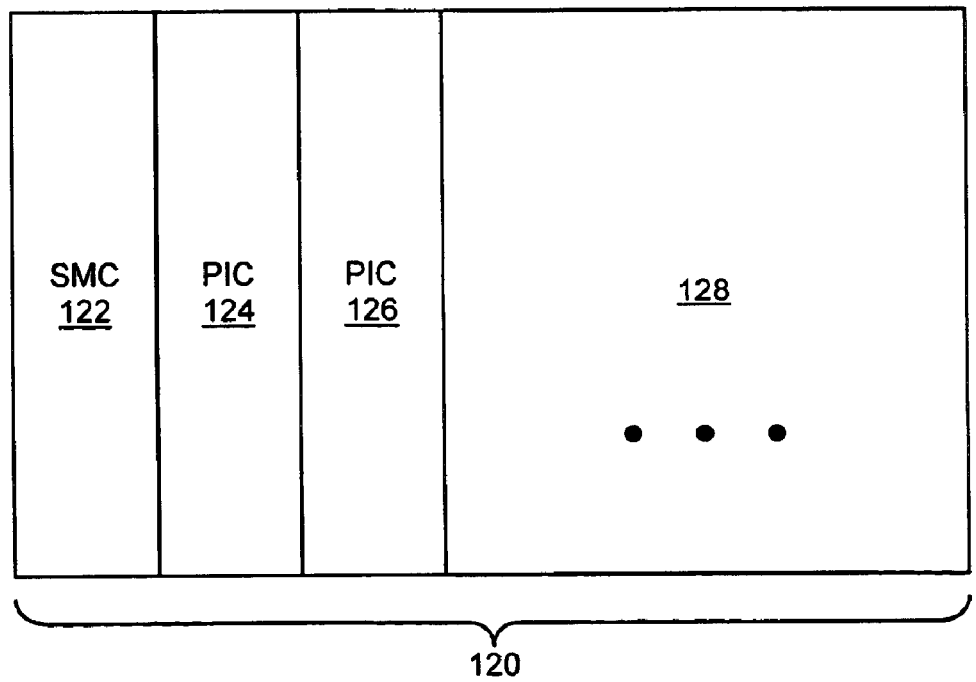
FIG. 6 shows an example of a networking device, such as an optical switch, including a number of separate printed circuit boards ("cards") installed within a backplane.

FIG. 6 shows an illustrative embodiment of a physical networking device on which the disclosed network node executable image may be executed. As shown in FIG. 6, a card cage 120 is provided that can receive a number of cards, including a Switch Management Card (SMC) 122, Port Interface Cards (PICs) 124 an 126, and a number of other cards 128. As used herein the term "card" is used to refer to a printed circuit board that provides a number of predetermined functions and/or services. The PICs 124 and 126 each include a number of interfaces to communication media external to the physical networking device. The other cards 128 may, for example, include a switch fabric used to direct data units received on the communication media interfaces of the PICs 124 and 126 to outgoing interfaces. The SMC 122 may include a microprocessor and associated memory for executing a network node executable image, such as the network node executable image 70 shown in FIG. 4. Accordingly, the SMC 122 may include an operating system equivalent to that used on the emulator machine or machines on which the network node executable image is executed in an emulation environment. In an illustrative embodiment, at least a portion of the executable code for the cards other than the SMC 122 in the physical networking device of FIG. 5 is generated from a set of source code which may also be used to generate executable code that may be used in conjunction with, or as part of, the network node executable image 70 shown in FIG. 4.

Those skilled in the art should readily appreciate that the programs defining the functions of the present invention can be delivered to a computer in many forms, including, but not limited to: (a) information permanently stored on nonwritable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits (ASICs), Programmable Logic Arrays (PLAs), or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A network emulator for providing an emulated network, said emulated network including a plurality of emulated networking devices, comprising:

a plurality of network node executable images, each one of said network nodes corresponding to one of said plurality of emulated networking devices; and wherein each of said network node executable images includes executable code that is operable to execute without modification on a physical networking device corresponding to one of said plurality of emulated networking devices, and wherein said executable code within each of said network node executable images that is operable to execute without modification on a corresponding physical networking device includes a program component operable to perform signaling and routing.

2. The network emulator of claim 1, wherein said executable code that is operable to execute without modification on said one of said plurality of emulated networking devices is operable to be executed within one of several cards that make up said one of said plurality of emulated networking devices.

3. The network emulator of claim 1, wherein said executable code that is operable to execute without modification on said one of said plurality of emulated networking devices includes a program component operable to maintain a representation of a topology of said emulated network.

4. The network emulator of claim 1, wherein said executable code that is operable to execute without modification on said one of said plurality of emulated networking devices includes a program component operable to maintain at least one emulated trunk between a corresponding one of said plurality of emulated networking devices and an adjacent one of said plurality of emulated networking devices.

5. The network emulator of claim 1, wherein said executable code that is operable to execute without modification on said one of said plurality of emulated networking devices includes a program component operable to maintain at least one emulated virtual circuit between a corresponding one of said plurality of emulated networking devices and another one of said plurality of emulated networking devices.

6. The network emulator of claim 1, wherein a plurality of said network node executable images execute on a single emulator machine, wherein said emulator machine includes at least one processor and at least one memory.

7. The network emulator of claim 1, wherein each of said plurality of network node executable images executes on a respective one of a plurality of emulator machines, each one of said plurality of emulator machines including at least one processor and at least one memory.

8. The network emulator of claim 7, wherein said plurality of emulator machines are interconnected by a local area network.

9. The network emulator of claim 8, wherein said local area network is an Ethernet local area network.

10. The network emulator of claim 1, wherein at least one of said plurality of network node executable images executes on an associated plurality of emulator machines.

11. The network emulator of claim 1, wherein each of said plurality of network node executable images further comprises:

a first protocol driver image operable to provide communications between said corresponding one of said plurality of emulated networking devices and other ones of said plurality of emulated networking devices within said network emulator; and a second protocol driver image operable to provide communications between a physical networking device of said physical networking device type associated with said corresponding one of said plurality of emulated networking devices and other physical networking devices.

12. A method of providing an emulated network, said emulated network including a plurality of emulated networking devices, comprising:

loading a plurality of network node executable images onto at least one emulator machine, each one of said network nodes corresponding to one of said plurality of emulated networking devices; and wherein each of said network node executable images includes executable code that is operable to execute without modification on a physical networking device corresponding to one of said plurality of emulated networking devices, and wherein said executable code within each of said network node executable images that is operable to execute without modification on a corresponding physical networking device includes a program component operable to perform signaling and routing.

13. The method of claim 12, wherein said executable code that is operable to execute without modification on said one of said plurality of emulated networking devices is operable to be executed within one of several cards that make up said one of said plurality of emulated networking devices.

14. The method of claim 12, further comprising maintaining, by a program component within said executable code that is operable to execute without modification on said one of said plurality of emulated networking devices, a representation of a topology of said emulated network.

15. The method of claim 12, further comprising maintaining, by a program component within said executable code that is operable to execute without modification on said one of said plurality of emulated networking devices, at least one emulated trunk between a corresponding one of said plurality of emulated networking devices and an adjacent one of said plurality of emulated networking devices.

16. The method of claim 12, further comprising maintaining, by a program component within said executable code that is operable to execute without modification on said one of said plurality of emulated networking devices, at least one emulated circuit between a corresponding one of said plurality of emulated networking devices and another one of said plurality of emulated networking devices.

17. The method of claim 12, further comprising executing a plurality of said network node executable images execute on a single one of said at least one emulator machine, wherein said single emulator machine includes at least one processor and at least one memory.

18. The method of claim 12, further comprising executing each of said plurality of network node executable images executes on a corresponding one of said at least one emulator machine, said corresponding one of said at least E one emulator machine including at least one processor and at least one memory.

19. The method of claim 18, further comprising communicating among said plurality of emulator machines over a local area network.

20. The method of claim 19, wherein said communicating comprises communicating over an Ethernet local area network.

21. The method of claim 12, further comprising executing at least one of said plurality of network node executable images executes on an associated plurality of said at least one emulator machine.

* * * * *

UNITED STATES PATENT AND TRADEMARK OFFICE
CERTIFICATE OF CORRECTION

PATENT NO. : 6,862,564 B1 Page 1 of 1
APPLICATION NO. : 09/696860
DATED : March 1, 2005
INVENTOR(S) : Chikong Shue et al.

It is certified that error appears in the above-identified patent and that said Letters Patent is hereby corrected as shown below:

Column 8, line 61, delete "us)"; and

Column 12, claim 18, line 16, delete "E".

Signed and Sealed this

Eighteenth Day of July, 2006

JON W. DUDAS
*Director of the United States Patent and Trademark Office*